(12) United States Patent
Hellholm et al.

(10) Patent No.: US 12,065,204 B2
(45) Date of Patent: Aug. 20, 2024

(54) TRACKED VEHICLE COMPRISING A TILTABLE SUSPENDED TRACK ASSEMBLY

(71) Applicant: BAE SYSTEMS HÄGGLUNDS AKTIEBOLAG, Örnsköldsvik (SE)

(72) Inventors: Björn Hellholm, Arnäsvall (SE); Leif Hallin, Umeå (SE); Jens Wågberg, Domsjö (SE); Daniel Engblom, Bonässund (SE); Max Thorén, Örnsköldsvik (SE); Anders Bodin, Örnsköldsvik (SE); Björn Nordberg, Örnsköldsvik (SE); Anders Sandin, Örnsköldsvik (SE)

(73) Assignee: Bae Systems Hägglunds Aktiebolag, Örnsköldsvik (SE)

( * ) Notice: Subject to any disclaimer, the term of this patent is extended or adjusted under 35 U.S.C. 154(b) by 892 days.

(21) Appl. No.: 16/461,734

(22) PCT Filed: Nov. 9, 2017

(86) PCT No.: PCT/SE2017/051117
§ 371 (c)(1),
(2) Date: May 16, 2019

(87) PCT Pub. No.: WO2018/093318
PCT Pub. Date: May 24, 2018

(65) Prior Publication Data
US 2019/0359269 A1 Nov. 28, 2019

(30) Foreign Application Priority Data
Nov. 18, 2016 (SE) .................................. 1651515-7

(51) Int. Cl.
*B62D 55/116* (2006.01)
*B62D 55/112* (2006.01)

(52) U.S. Cl.
CPC .......... *B62D 55/116* (2013.01); *B62D 55/112* (2013.01)

(58) Field of Classification Search
CPC .. B62D 55/084; B62D 55/104; B62D 55/112; B62D 55/116
(Continued)

(56) References Cited

U.S. PATENT DOCUMENTS 1,355,853 A * 10/1920 Habsburg-Lothringen ..................
B62D 55/02
180/6.54
2,502,802 A * 4/1950 Sievers ................... B64C 25/38
244/102 R
(Continued)

FOREIGN PATENT DOCUMENTS

CN 1511097 A 7/2004
CN 1544211 A 11/2004
(Continued)

OTHER PUBLICATIONS

Search Report received for Chinese Patent Application No. 201780071157.5, search date Mar. 24, 2021, 4 pages. (English translation p. 1-2, Original copy p. 3-4).
(Continued)

*Primary Examiner* — Anne Marie M Boehler
(74) *Attorney, Agent, or Firm* — Morrison & Foerster LLP

(57) ABSTRACT

The invention relates to a tracked vehicle (10; 11) comprising a vehicle body (30, 32; 30), at least one track assembly (21) and a suspension device (S) for suspension of said track assembly (21) to said vehicle body (30) of said tracked vehicle (10; 11). Said track assembly (21) comprises a track support beam (22), a plurality of road wheels (23, 23a), at
(Continued)

least one drive wheel (24), and an endless track (25). Said track support beam (22) is arranged to support said at least one drive wheel (24) and a plurality of road wheels (23, 23a). Said endless track is disposed around said at least one drive wheel (24) and plurality of road wheels (23, 23a). Said suspension device (S) comprises two pendulum arms (52, 54) which in one end are rotatably attached to a respective fastening point (P1b, P2b) in said vehicle body (30; 32, 30) and in the other end are rotatably attached to a respective fastening point (P1a, P2a) in the track support beam (22) of said track assembly (21). Said suspension device (S) comprises distance adjustment means (58) which is arranged to allow one or more of: a distance change between said two fastening points (P1a, P2a) in the track assembly (21); a distance change between the two fastening points (P1b, P2b) in the vehicle body (30); and a distance change between the fastening point (P1b, P2b) in the vehicle body (30; 32, 30) and the fastening point (P1a, P2a) in the track support beam (22) of said track assembly (21) of at least one of the pendulum arms (52, 54), so as to allow a tilting movement of the track assembly (21), including said at least one drive wheel (24) and plurality of road wheels (23, 23a), relative to the vehicle body in a plane extending in the longitudinal direction of said track assembly (21) essentially orthogonal to the transversal extension of said track assembly (21).

5 Claims, 4 Drawing Sheets

(58) Field of Classification Search
USPC .................................................. 180/9.5, 9.52
See application file for complete search history.

(56) References Cited

U.S. PATENT DOCUMENTS

| | | | | |
|---|---|---|---|---|
| 2,967,578 | A | | 1/1961 | Schomers |
| 3,189,116 | A | * | 6/1965 | Steffen ............... B62D 55/0842 |
| | | | | 180/41 |
| 3,230,846 | A | * | 1/1966 | Curlett ............... B62D 55/0842 |
| | | | | 404/84.2 |
| 3,879,092 | A | * | 4/1975 | Rose ..................... B62M 27/02 |
| | | | | 180/193 |
| 3,930,553 | A | * | 1/1976 | Kopera ................. B62D 55/08 |
| | | | | 180/9.28 |
| 3,945,451 | A | * | 3/1976 | Aaen ..................... B62M 27/02 |
| | | | | 305/127 |
| 4,057,916 | A | * | 11/1977 | Roemer ................... E01H 4/02 |
| | | | | 37/223 |
| 4,679,803 | A | * | 7/1987 | Biller ................... A01G 23/083 |
| | | | | 180/41 |
| 5,390,752 | A | * | 2/1995 | Urbanczyk .......... B62D 55/116 |
| | | | | 180/41 |
| RE38,124 | E | * | 5/2003 | Mallette ............... B62D 55/116 |
| | | | | 180/9.56 |
| 2009/0118913 | A1 | | 5/2009 | O'Halloran et al. |
| 2013/0284525 | A1 | | 10/2013 | Allaire |
| 2016/0068205 | A1 | | 3/2016 | Hellholm et al. |
| 2016/0318565 | A1 | | 11/2016 | Spears et al. |
| 2018/0162465 | A1 | * | 6/2018 | Visscher ................ B62D 55/06 |
| 2019/0359268 | A1 | * | 11/2019 | Hellholm .............. B62D 55/065 |
| 2020/0009932 | A1 | * | 1/2020 | Pettersson ............ B62D 55/116 |

FOREIGN PATENT DOCUMENTS

| | | |
|---|---|---|
| CN | 102582705 A | 7/2012 |
| CN | 205469354 U | 8/2016 |
| FR | 2818606 A1 | 6/2002 |
| JP | 9-154310 A | 6/1997 |
| JP | 2002205667 A | 7/2002 |
| JP | 2003040153 A | 2/2003 |
| JP | 2011156975 A | 8/2011 |
| RU | 2025378 C1 | 12/1994 |
| SU | 1081058 A1 | 3/1984 |
| WO | WO-2014182235 A1 | 11/2014 |
| WO | WO-2016072914 A1 | 5/2016 |

OTHER PUBLICATIONS

Office Action received for Swedish Patent Application No. 1651515-7, mailed on Jun. 15, 2017, 5 pages.
Swedish Search Report received for Swedish Patent Application No. 1651515-7, mailed on Jun. 15, 2017, 2 pages.
International Search Report received for PCT Patent Application No. PCT/SE2017/051117, mailed on Jan. 8, 2018, 5 pages.
Search Report received for Russian Patent Application No. 2019118651, mailed on Jan. 28, 2021, 4 pages. (English translation pp. 1-2, Original copy pp. 3-4).
Kristi, (Mar. 15, 2016). "Kristi Vehicle Brochures," WayBackMachine Archive, located at <https://web.archive.org/web/20160315192104/http:/www.kristisnowcat.com/brochures/index.asp>, 3 pages.

* cited by examiner

TRACKED VEHICLE COMPRISING A TILTABLE SUSPENDED TRACK ASSEMBLY

CROSS REFERENCE TO RELATED APPLICATIONS

This application is a U.S. National Phase patent application under 35 U.S.C. § 371 of PCT/SE2017/051117, filed Nov. 9, 2017, which claims priority to Sweden Patent Application No. SE 1651515-7, filed Nov. 18, 2016, the disclosures of which are incorporated herein by reference in their entirety.

TECHNICAL FIELD

The present invention relates to a tracked vehicle according to the preamble of claim 1.

BACKGROUND

Tracked vehicles normally comprise a pair of track assemblies, where each track assembly of the pair of track assemblies comprises a track support beam, a drive wheel, a plurality of support wheels and an endless track running over the drive wheel and said plurality of support wheels. Said drive wheel and said plurality of support wheels are rotatably secured to said track support beam.

In order to improve mobility and comfort of such a tracked vehicle, the vehicle needs to be provided with a suspension device.

US2012012407 discloses a suspension device for suspension of a track assembly to a vehicle body of a tracked vehicle, said suspension device comprising two pendulum arms which in one end are rotatably mounted to said vehicle body and in the other end being rotatably mounted to a respective fastening point in the track assembly.

WO2014182235 discloses a tracked vehicle comprising a vehicle body and a track assembly arranged to be supported by said vehicle body by means of a suspension device, said track assembly comprising a track support beam for supporting a plurality of road wheels, an endless track being disposed around said road wheels. Said suspension device comprises a track assembly suspension configuration configured to connect the track assembly pair with a centrally arranged vehicle body. Said track assembly suspension configuration comprises a front trailing A-arm configuration and a rear trailing link arm configuration for the respective track assembly.

There is however a need to present improvements in such suspension devices for tracked vehicles for improved mobility and comfort.

OBJECT OF THE INVENTION

It is an object of the present invention to provide a tracked vehicle having a suspension device enabling improved comfort when driving the tracked vehicle.

A further object of the present invention is to provide a tracked vehicle, such as a forestry vehicle, having a suspension device which facilitates the transport of cargo when driving in rough terrain for enabling increased productivity of a tracked work vehicle, such as a forestry vehicle.

SUMMARY OF INVENTION

These and other objects, which will become apparent from the following description, are achieved by means of a tracked vehicle as set out in the appended independent claim. Preferred embodiments of the tracked vehicle are defined in the appended dependent claims.

Specifically an object of the invention is achieved by a tracked vehicle comprising a vehicle body, at least one track assembly and a suspension device for suspension of said track assembly to said vehicle body of said tracked vehicle. Said track assembly comprises a track support beam, a plurality of road wheels, at least one drive wheel, and an endless track. Said track support beam is arranged to support said at least one drive wheel and a plurality of road wheels. Said endless track is disposed around said at least one drive wheel and plurality of road wheels. Said suspension device comprises two pendulum arms which in one end are rotatably attached to a respective fastening point in said vehicle body and in the other end are rotatably attached to a respective fastening point in the track support beam of said track assembly. Said suspension device comprises distance adjustment means which is arranged to allow one or more of: a distance change between said two fastening points in the track assembly; a distance change between the two fastening points in the vehicle body; and a distance change between the fastening point in the vehicle body and the fastening point in the track support beam of said track assembly of at least one of the pendulum arms, so as to allow a tilting movement of the track assembly, including said at least one drive wheel and plurality of road wheels, relative to the vehicle body in a plane extending in the longitudinal direction of said track assembly orthogonal to the transversal extension of said track assembly.

By thus providing such a distance adjustment means, mobility and comfort of the tracked vehicle may be further improved in that said tilting movement of the track assembly relative to the vehicle body is facilitated.

Said track assembly thus comprises a track support beam for supporting a plurality of road wheels and at least one drive wheel, an endless track being disposed around said road wheels. Said track support beam is thus arranged to support said at least one drive wheel and plurality of road wheels. Said at least one drive wheel and plurality of road wheels are thus attached to said track support beam. Said endless track is arranged to be disposed around said at least one drive wheel and plurality of road wheels.

Said two pendulum arms are hereby in one end rotatably attached to said respective fastening point in said vehicle body and in the other end rotatably attached to a respective fastening point in the track support beam of said track assembly.

By thus allowing a tilting movement of the track assembly, including said at least one drive wheel and plurality of road wheels, relative to the vehicle body mobility is improved in that the vehicle body may be held essentially horizontal when driving in both uphill slopes and downhill slopes, thereby facilitating transport of cargo when driving in rough terrain, thus enabling increased productivity of a tracked work vehicle, such as a forestry vehicle.

Said respective fastening point in said vehicle body is according to an embodiment arranged at a distance from each other along the longitudinal extension of the vehicle body. Said respective fastening point in said vehicle body is according to an embodiment arranged at essentially the same level in connection to the vehicle body with regard to the extension of the vehicle body orthogonal to the longitudinal and transversal extension of the vehicle body, i.e. essentially the same horizontal level along the vehicle body when the vehicle body is horizontally arranged. Said respective fastening point in said vehicle body thus comprises a front fastening point and a rear fastening point.

Said respective fastening point in said track assembly is according to an embodiment arranged at a distance from each other along the longitudinal extension of the track assembly. Said respective fastening point in said track assembly is according to an embodiment arranged at a distance from each other along the longitudinal extension of track support beam at essentially the same level in connection to the track support beam with regard to the extension of the track support beam orthogonal to the longitudinal and transversal extension of the track support beam, i.e. essentially the same horizontal level along the track support beam when the track assembly pair of the vehicle is horizontally arranged on the ground. Said respective fastening point in said track assembly, e.g. track support beam, thus comprises a front fastening point and a rear fastening point.

Said two pendulum arms of the suspension device thus comprise a front pendulum arm and a rear pendulum arm. Said front pendulum arm is in one end configured to be rotatably arranged to the front fastening point in said vehicle body about an axis of rotation and in the opposite end configured to be rotatably arranged to said front fastening point in said track assembly about an axis of rotation. Said rear pendulum arm is in one end configured to be rotatably arranged to the rear fastening point about an axis of rotation in said vehicle body and in the opposite end configured to be rotatably arranged to said rear fastening point in said track assembly about an axis of rotation.

According to an embodiment of the tracked vehicle said adjustment means of the suspension device comprises a crank throw configuration for at least one of the pendulum arms for allowing said distance change between the fastening point in the vehicle body and the fastening point in the track assembly of said at least one of the pendulum arms. By thus providing a crank throw configuration a robust and efficient arrangement for allowing said distance changes is provided. Thus, hereby a robust and efficient arrangement for providing a movement of the track assembly relative to the vehicle body comprising said tilting movement of the track assembly relative to the vehicle body is obtained.

Thus, according to an embodiment at least one of said pendulum arms is rotatably attached to its fastening point in the vehicle body and its fastening point in the track assembly via a crank throw configuration.

According to an embodiment of the tracked vehicle said adjustment means comprises a slide configuration in connection to at least one of said two fastening points in the track assembly for allowing said distance change between said two fastening points in the track assembly. By thus providing a slide configuration a robust and efficient arrangement for allowing said distance changes is provided. Thus, hereby a robust and efficient arrangement for providing a movement of the track assembly relative to the vehicle body comprising said tilting movement of the track assembly relative to the vehicle body is obtained.

The slide configuration may comprise a slide rail, a slide pad or the like. The slide configuration is according to an embodiment arranged in at least one of said fastening points of said two fastening points of said track assembly, e.g. in the track support beam of said track assembly. Thus, according to an embodiment at least one of said fastening points of said two fastening points of said track support beam comprises, is comprised in or constitutes a slide configuration for allowing said distance change between at least one of said fastening points in the track support beam and said fastening point in the vehicle body.

According to an embodiment of the tracked vehicle said adjustment means comprises a slide configuration in connection to at least one of said two fastening points in the vehicle body for allowing said distance change between said two fastening points in the vehicle body. By thus providing a slide configuration a robust and efficient arrangement for allowing said distance changes is provided. Thus, hereby a robust and efficient arrangement for providing a movement of the track assembly relative to the vehicle body comprising said tilting movement of the track assembly relative to the vehicle body is obtained.

According to an embodiment of the tracked vehicle the suspension device further comprises a suspension configuration for damping the movement of the track assembly relative to the vehicle body and/or for controlling the position of the track assembly relative to the vehicle body.

By thus providing a suspension configuration for damping the movement of said track assembly relative to the vehicle body comfort and mobility may be improved in that impacts on the track assembly during drive of the vehicle are reduced/absorbed due to said damping of the movement of the track assembly relative to the vehicle body. Herby load on the vehicle structure in form of vibrations, shocks and impacts are reduced.

By thus providing a suspension configuration for controlling the position of the track assembly relative to the vehicle body mobility and comfort of the vehicle may be improved in that tilting of the vehicle body relative to the track assembly pair in said plane transversal to the longitudinal extension of the track support beam, raising and lowering of the vehicle body relative to the track assembly pair, and tilting of the vehicle body relative to the track assembly pair in the transversal plane of the track assembly pair of the tracked vehicle may be controlled based on the configuration of ground on which the tracked vehicle is travelling. Thus driving in terrain involving slopes such as downhill slopes, uphill slopes, side slopes and/or other formations of the ground comprising e.g. obstacles will hereby be improved.

According to an embodiment of the tracked vehicle said suspension configuration is arranged between the vehicle body and at least one of said two pendulum arms for damping the movement of said at least one pendulum arm and/or controlling the position of said at least one pendulum arm in said rotational plane. Hereby an efficient and robust arrangement for facilitating said damping and control is obtained.

According to an embodiment of the tracked vehicle said suspension configuration comprises at least one hydraulic cylinder.

Said suspension configuration comprises according to an embodiment a pair of hydraulic cylinders for the respective track assembly of the tracked vehicle. Said pair of hydraulic cylinders for the respective track assembly of the tracked vehicle comprises a front hydraulic cylinder connected between the front pendulum arm and a front fastening point of the vehicle body and a rear hydraulic cylinder connected between the rear pendulum arm and a rear fastening point of the vehicle body.

The front hydraulic cylinder is at one end portion rotatably attached in connection to the front pendulum arm and at an opposite end portion rotatably attached to said front fastening point of the vehicle body. The rear hydraulic cylinder is at one end portion rotatably attached in connection to the rear pendulum arm and at an opposite end portion rotatably attached to said rear fastening point of the vehicle body.

The front hydraulic cylinder is according to an embodiment at said one end portion rotatably attached to the track assembly about the same axis of rotation as the front pendulum arm. The rear hydraulic cylinder is according to an embodiment at said one end portion rotatably attached to the track assembly about the same axis of rotation as the rear pendulum arm.

Said front hydraulic cylinder and rear hydraulic cylinder are arranged to be connected such that hydraulic flow is distributed between the front and the rear hydraulic cylinder based on the force acting on the front and rear hydraulic cylinder. This facilitates the bogie function of the track assemblies of the vehicle such that the vehicle body of the tracked vehicle to a greater extent can be withheld in parallel with the ground plane during propulsion of the vehicle, whereby comfort is improved. Furthermore, the mobility of the vehicle is hereby improved, thus enabling passage over larger obstacles and ditches.

The tracked vehicle comprises said vehicle body, said at least one track assembly and said suspension device. Said track assembly comprises a track support beam for supporting a plurality of road wheels, an endless track being disposed around said road wheels.

The tracked vehicle comprises opposite track assemblies, a right track assembly and the opposite track assembly constituting a left track assembly, said right and left track assemblies constituting a track assembly pair. For a tracked vehicle comprising more than one vehicle unit, each vehicle unit comprises such a track assembly pair.

Said track support beam is further arranged to support at least one drive wheel and a tension wheel, said endless track being disposed around said wheels. Thus, said endless track is arranged to be disposed around said at least one drive wheel. Further said endless track is arranged to be disposed around said tension wheel.

According to an embodiment said tracked vehicle is an articulated vehicle comprising a first vehicle unit and a second vehicle unit pivotably connected to the first vehicle unit via an articulation joint, each of said vehicle units comprising a vehicle body and two track assemblies connected to respective sides of said vehicle body by means of a suspension device comprising said pendulum arms and said distance adjustment means. The tracked vehicle may thus comprise one or more tracked vehicle units.

According to an embodiment said tracked vehicle is a forestry vehicle.

According to an embodiment said tracked vehicle is a forwarder.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which:

FIG. 3b schematically illustrates a perspective view the track assembly with suspension device in FIG. 3a;

DETAILED DESCRIPTION OF THE INVENTION

Herein, the term "track support beam" refers to a structural element arranged to support ground-engaging means such as e.g. an endless track as well as drive wheel and support wheels.

Herein, the term "track assembly" refers to a unit of the tracked vehicle comprising track support beam, drive wheel and support wheels as well as a circumferential endless track, which unit is arranged to comprise ground-engaging means and configured to propel the vehicle and thus form at least part of a drive unit of the tracked vehicle.

Herein, the term "track assembly pair" refers to opposite track assemblies of a vehicle unit of the vehicle, one track assembly constituting a right track assembly and the opposite track assembly constituting a left track assembly.

Herein, the term "articulated vehicle" refers to a vehicle with at least a front and a rear vehicle unit which are pivotable relative to each other about at least one joint.

Hereinafter the term "vehicle body" refers to any structure of a vehicle configured to support track assemblies of a tracked vehicle and may comprise or constitute the vehicle chassis. The term "vehicle body" may refer to a vehicle frame, one or more beams or the like.

Hereinafter the term "pendulum arm" refers to any suitable arm configuration configured to be rotatably/pivotably attached at one end to the vehicle body of a tracked vehicle and at the other end configured to be rotatably/pivotably attached to the track assembly of said tracked vehicle. The pendulum arm may be denoted rocker arm, swing arm or the like.

Figure 1:
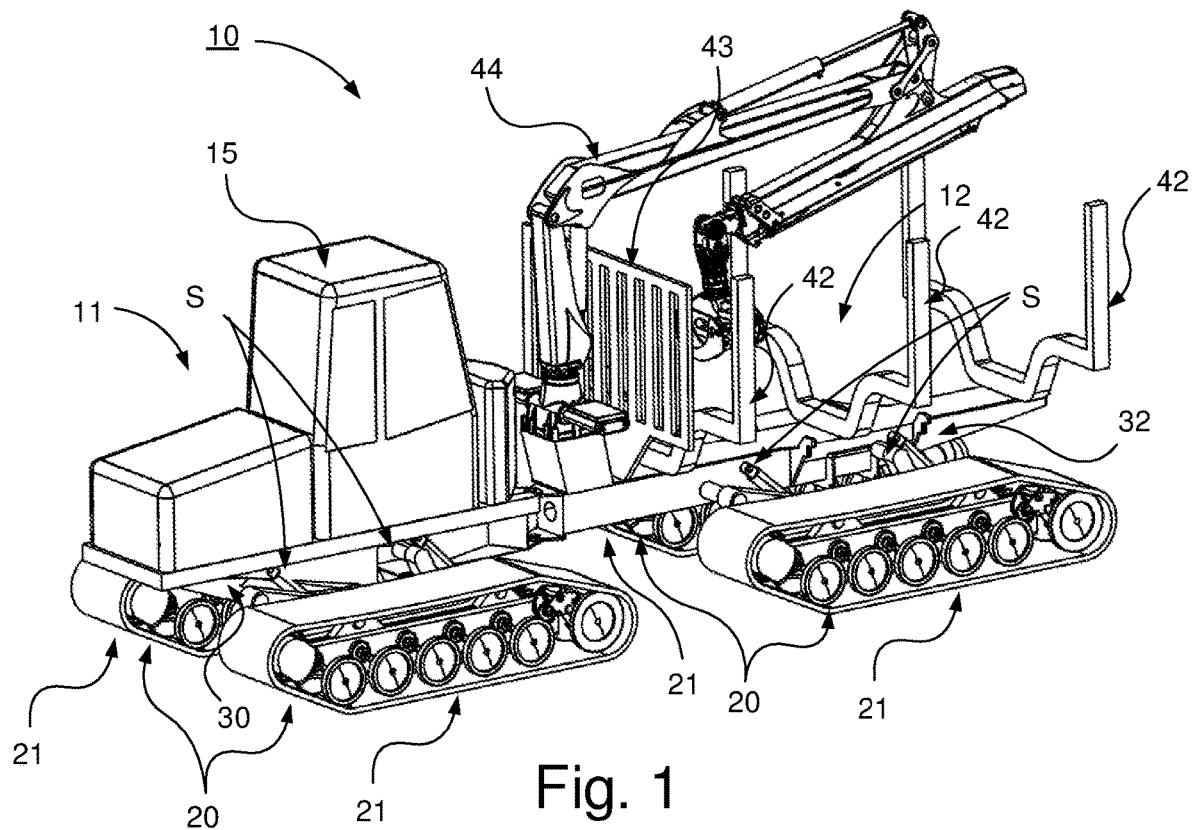
FIG. 1 schematically illustrates a perspective view of a tracked vehicle according to an embodiment of the invention.

Referring to FIG. 1, a tracked vehicle 10 according to the present invention is illustrated, provided with a front vehicle unit 11 and a rear vehicle unit 12.

Each of the front and rear vehicle unit comprises a track assembly pair 20. Said track assembly pair 20 is constituted by or comprised of a drive unit pair. Said track assembly pair 20 comprises two track assemblies 21 arranged on opposite sides of the vehicle 10. The respective track assembly 21 is constituted by or comprised of a drive unit. The respective track assembly 21 is constituted by a driving track assembly and is arranged for propulsion of the vehicle. The respective track assembly pair 20 is connected to an intermediate vehicle body 30, 32, such as a chassis beam. Thus, the front vehicle unit 11 comprises a vehicle body 30 and the rear vehicle unit 12 comprises a vehicle body 32.

Each of the front and rear vehicle unit 11, 12 comprises a suspension device S for the respective track assembly 21. The respective track assembly 21 of the respective vehicle unit 11, 12 is thus arranged to be supported by the respective vehicle body 30, 32 by means of said suspension device S. The suspension device S is described in more detail with reference to FIGS. 3a-c and 4a-d.

Said vehicle body 30, 32 of the respective vehicle unit 11, 12 is arranged to 10 support a vehicle structure, e.g. in the form of a vehicle cabin, power supplies, load carrying structure and a crane.

According to this configuration of the vehicle 10, the vehicle body 30 of the front vehicle unit 11 is arranged to support a vehicle cabin 15 and a power supply, such as an internal combustion engine, where the internal combustion engine according to one embodiment is constituted by a diesel engine.

According to this configuration of the vehicle 10, the vehicle body 32 of the rear vehicle unit 12 is arranged to support a U-beam configuration 42 or a load beam configuration 42 for supporting timber and a loading gate 43. The vehicle body 32 of the rear vehicle unit 12 is according to this embodiment also arranged to support a crane 44 for loading/unloading of timber.

The exemplified vehicle 10 is a tracked forestry vehicle in the form of a forwarder intended to transport timber from a harvesting site to a collection site. The vehicle 10 according to the present invention may be constituted by any suitable tracked vehicles. According to one embodiment, the vehicle 10 is a harvester intended for cutting timber.

The exemplified vehicle 10 is a diesel-electric driven vehicle. The vehicle 10 may according to one alternative have any suitable power supply for the propulsion of the vehicle. The vehicle 10 is according to one alternative a hybrid-powered vehicle. The vehicle 10 is according to one alternative electrically driven, where power according to one alternative is supplied by means of an energy storage device such as a battery unit, fuel cell or capacitor unit. The vehicle comprises a suspension device described below with reference to FIGS. 2, 3a-b, 4a-d and 5a-c.

Figure 2:
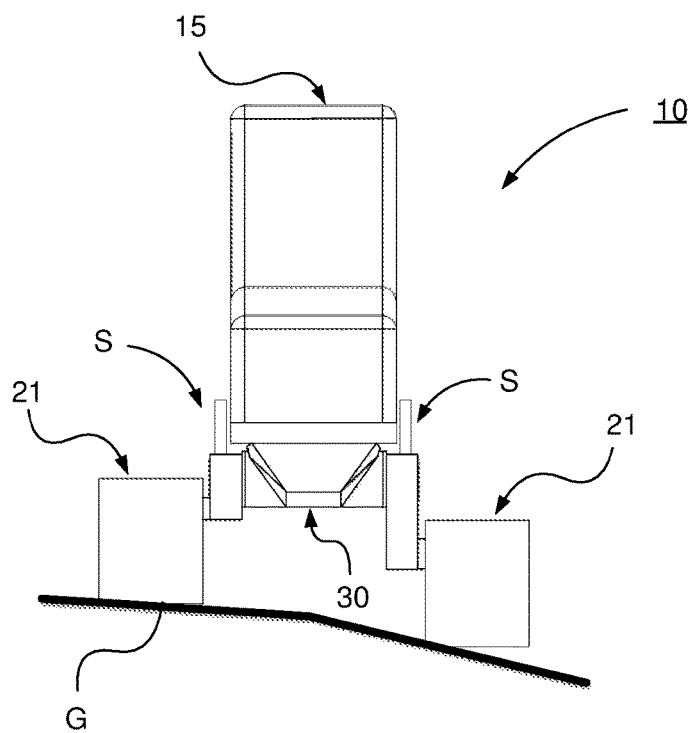
FIG. 2 schematically illustrates a front view of the tracked vehicle in FIG. 1.

FIG. 2 schematically illustrates a front view of the tracked vehicle in FIG. 1 during driving in a side slope of a ground G, wherein control of the vehicle suspension device S enables the vehicle body 30 of the vehicle 10 and thus the cab 15 of the vehicle to be kept substantially horizontal by raising/lowering the track assemblies 21 of the vehicle 10.

Figure 3A:
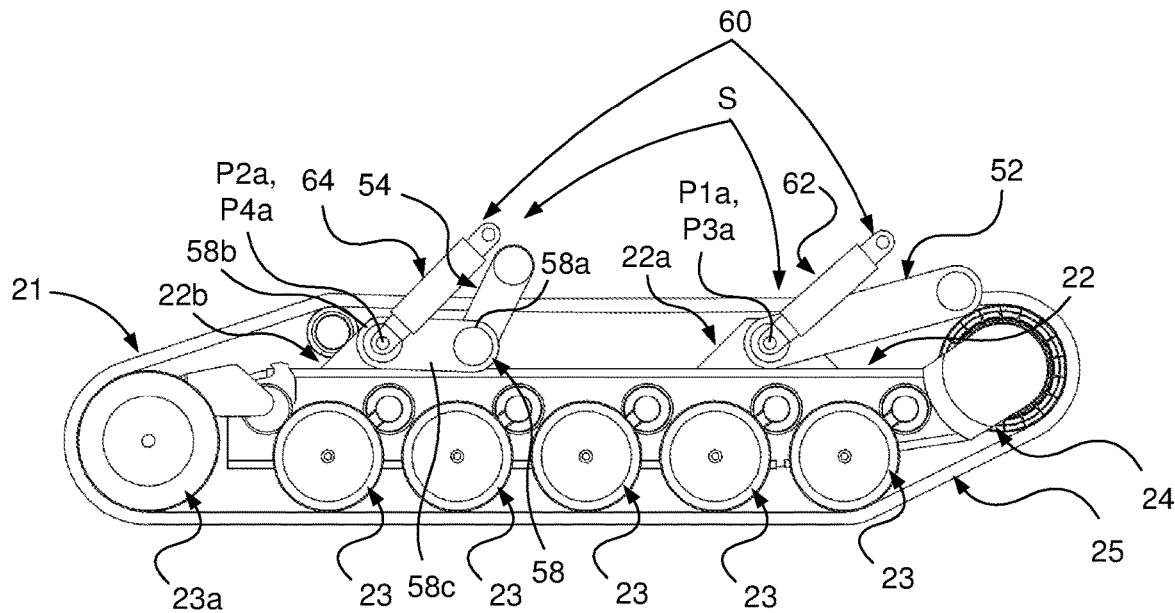
FIG. 3a schematically illustrates a side view of a track assembly with a suspension device according to an embodiment of the present invention.
Figure 3B:
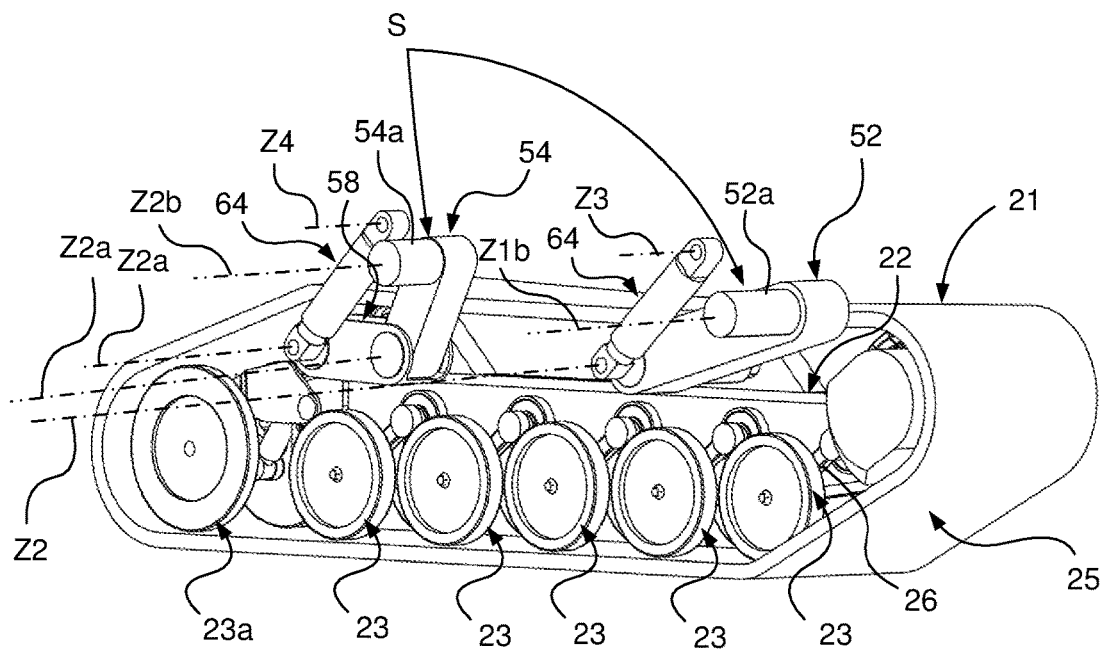

FIG. 3a schematically illustrates a side view of a track assembly 21 with a suspension device S according to an embodiment of the present invention, and FIG. 3b schematically illustrates a perspective view of the track assembly 21 in FIG. 3a.

The track assembly 21 is together with another track assembly arranged to form a track assembly pair as described with reference to FIG. 1 arranged to drive a tracked vehicle/tracked vehicle unit.

The track assembly 21 comprises a track support beam 22, which is here constituted by a skid beam. The track assembly further comprises a set of support wheels 23, 23a, a drive wheel 24, and an endless track 25. Said endless track 25 is arranged to run over the drive wheel 24 and said set of support wheels 23, 23a. The track assembly 21 has one drive wheel but may have more than one drive wheel.

Said set of support wheels 23, 23a and the drive wheel 24 are arranged to be rotatably supported by said track support beam 22 in a suitable manner. Said set of support wheels 23, 23a are arranged in a pair configuration, meaning that the respective support wheels 23, 23a in each pair configuration is arranged on opposite sides of said track support beam 22. The support wheel 23a arranged at the very rear of the track support beam 22 also has a track tension wheel function and is constituted by a tension wheel.

Figure 4A:
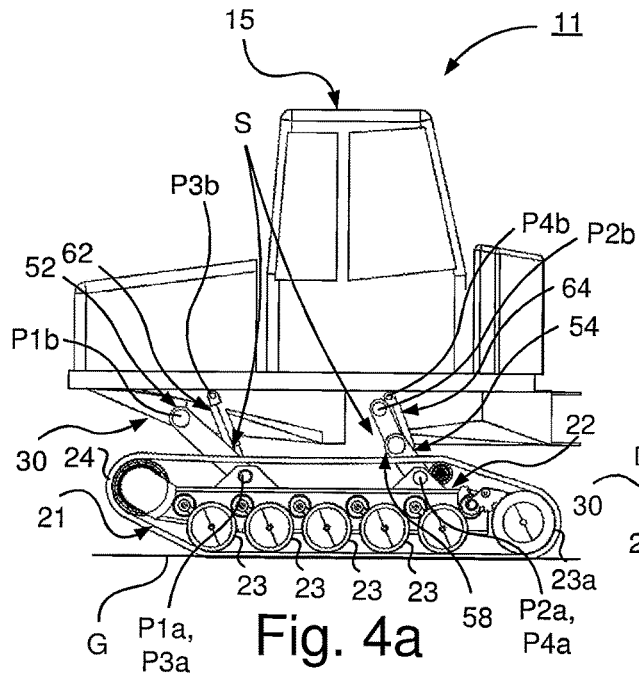
FIG. 4a schematically illustrates a side view of a tracked vehicle with a suspension device where the vehicle body is raised relative to the track assembly.

The suspension device S comprises two pendulum arms 52, 54 which in one end are configured to be rotatably attached to a respective fastening point P1b, P2b in the vehicle body 30, see FIG. 4a, and in the other end are rotatably attached to a respective fastening point P1a, P2a in the track assembly 21.

Said fastening points P1a, P2a in said track assembly 21 are according to this embodiment arranged at a distance from each other along the longitudinal extension of the track assembly 21. Said fastening points P1a, P2a in said track assembly is according to this embodiment arranged at a distance from each other along the longitudinal extension of said track support beam 22 at essentially the same level in connection to the track support beam 22 with regard to the extension of the track support beam 22 essentially orthogonal to the longitudinal and transversal extension of the track support beam 22, i.e. essentially the same horizontal level along the track support beam 22 when the track assembly pair of the vehicle is horizontally arranged on the ground, see FIG. 4a. Said respective fastening point P1a, P2a in said track support beam 22 thus comprises a front fastening point P1a and a rear fastening point P2a.

As shown in FIG. 4a, said fastening points P1b, P2b in said vehicle body 30 are according to this embodiment arranged at a distance from each other along the longitudinal extension of the vehicle body. Said respective fastening point P1b, P2b in said vehicle body is according to this embodiment arranged at essentially the same level in connection to the vehicle body 30 with regard to the extension of the vehicle body orthogonal to the longitudinal and transversal extension of the vehicle body, i.e. essentially the same horizontal level along the vehicle body when the vehicle body is horizontally arranged. Said respective fastening point P1b, P2b in said vehicle body thus comprises a front fastening point P1b and a rear fastening point P2b.

Said two pendulum arms 52, 54 of the suspension device S thus comprise a front pendulum arm 52 and a rear pendulum arm 52. Said front pendulum arm 52 is in one end configured to be rotatably arranged to the front fastening point in said vehicle body about an axis of rotation Z1b and in the opposite end configured to be rotatably arranged to said front fastening point P1a in said track assembly 21 about an axis of rotation Z1a. Said rear pendulum arm 54 is in one end configured to be rotatably arranged to the rear fastening point about an axis of rotation Z2b in said vehicle body and in the opposite end configured to be rotatably arranged to said rear fastening point P2a in said track assembly 21 about an axis of rotation Z2a.

The track support beam 22 comprises a front element 22a comprising said front fastening point P1 and a rear element 22b comprising said rear fastening point P2. Said front element 22a and rear element 22b constitute integrated parts of said track support beam 22 arranged between two longitudinal beams of the track support beam 22 and arranged to project from an upper portion of said longitudinal beams within the circumference of the endless track surrounding the track support beam 22.

The front pendulum arm 52 is rotatably attached to the front fastening point P1a in the front element 22a of the track support beam 22. The front pendulum arm 52 is pivotably connected to the front fastening point P1a about said axis Z1a.

The rear pendulum arm 54 is rotatably attached to the rear fastening point P2a in the rear element 22b of the track support beam 22. The rear pendulum arm 54 is pivotably connected to the rear fastening point P2a about said axis Z2a.

Said suspension device S comprises distance adjustment means arranged to allow one or more of: a distance change between said two fastening points P1a, P2a in the track assembly 21; a distance change between the two fastening points in the vehicle body P1b, P2b; and a distance change between a fastening point in the vehicle body and a fastening point in the track assembly 21 of at least one of the pendulum arms 52, 54, so as to allow a tilting movement of the track assembly 21 relative to the vehicle body in a plane extending in the longitudinal direction of said track assembly orthogonal to the transversal extension of said track assembly, see FIG. 4a-d.

According to this embodiment of the suspension device S said adjustment means comprises a crank throw configuration 58 for the rear pendulum arm 54 for allowing said distance change between the fastening point P2b in the vehicle body 30 and the fastening point P2a in the track assembly 21 of said rear pendulum arm 54. A distance change is thus also allowed between the fastening point P1b in the vehicle body 30 and the fastening point P2a in the track assembly 21, i.e. rear element 22b of the track support beam 22.

As shown in FIG. 3a, the crank throw configuration 58 comprises a first link member 58a rotatably connected to the an end portion of the rear pendulum arm 54, a second link member 58b connected to said rear element 22b of the track support beam 22, and a crank member 58c at one end portion rotatably connected to the first link member 58a and at an opposite end portion rotatably connected to said rear element 22b of the track support beam 22 via the second link member 58b about said axis of rotation Z2a, see FIG. 3b.

The rear pendulum arm 54 is thus rotatably connected to the rear fastening point P2a about said axis Z2a via said crank throw configuration 58. The rear pendulum arm 54 is thus rotatably connected to the first link member 58a about an axis Z2. The axis of rotation Z2a and axis of rotation Z2 are essentially parallel and at a distance from each other corresponding to the distance between the first link member 58a and second link member 58b in their axial connection points in the crank member 58c.

The suspension device S comprises or constitutes a track assembly suspension configuration.

Said suspension device S further comprises a suspension configuration which according to this embodiment is constituted by a gas hydraulic suspension configuration 60. The gas hydraulic suspension configuration 60 is arranged for damping the movement of said track assembly 21 relative to the vehicle body.

The gas hydraulic suspension configuration 60 is further arranged for controlling the position of the track assembly relative to the vehicle body.

As shown in e.g. FIG. 4a-d said gas hydraulic suspension configuration 60 is configured to be arranged between the vehicle body and said track assembly 21 for damping the movement of said pendulum arms 52, 54 and controlling the position of said of said pendulum arms 52, 54 in said rotational plane.

Said gas hydraulic suspension configuration 60 comprises according to this embodiment a pair of hydraulic cylinders 62, 64 for the respective track assembly 21 of the tracked vehicle. Said pair of hydraulic cylinders 62, 64 comprises a front hydraulic cylinder 62 arranged to be connected between the front pendulum arm 52 and a front fastening point P3b of the vehicle body 30 and a rear hydraulic cylinder 64 arranged to be connected between the rear pendulum arm 54 and a rear fastening point P4b of the vehicle body 30, see FIG. 4a.

As shown in FIG. 3a-b, the front hydraulic cylinder 62 is at one end portion rotatably attached in connection to the front pendulum arm 52 about an axis corresponding to the axis Z1a and at an opposite end portion configured to be rotatably attached to vehicle body about an axis Z3. The rear hydraulic cylinder 64 is at one end portion rotatably attached to the rear pendulum arm 54 about an axis corresponding to the axis Z2a and at an opposite end portion configured to be rotatably attached to said vehicle body about an axis Z4.

As shown in FIG. 4a, the front hydraulic cylinder 62 is at one end portion rotatably attached to a fastening point P3a corresponding to the fastening point P1a of the front pendulum arm 52 and at an opposite end portion rotatably attached to said front fastening point P3 of the vehicle body 30. The rear hydraulic cylinder 64 is at one end portion rotatably attached to a fastening point P4a corresponding to the fastening point P1a of the rear pendulum arm 54 and at an opposite end portion rotatably attached to said rear fastening point P4b of the vehicle body 30.

The respective track assembly of the tracked vehicle thus comprises such a gas hydraulic suspension configuration 60 comprising pair of hydraulic cylinders 62, 64.

According to an embodiment said front and rear hydraulic cylinders 62, 64 of the gas hydraulic suspension configuration consist respectively of a hydro-pneumatic combined spring and damper means comprising a hydraulic piston cylinder device and a gas spring device communicating with the hydraulic piston cylinder device via a restricting member.

Said front and rear hydraulic cylinders 62, 64 are arranged to be coupled to each other such that hydraulic flow is distributed between the front and rear hydraulic cylinders based on the force acting on the front and rear hydraulic cylinder 62, 64, respectively. Said hydraulic flow is arranged to be distributed such that the one of said front and rear hydraulic cylinders 62, 64 that absorbs the relatively higher force is compressed and the other is correspondingly expanded by hydraulic flow flowing from one of the hydraulic cylinders to the other 62, 64. FIG. 5b describes this in more detail.

As shown e.g. in FIG. 4a-d and FIG. 1, said vehicle body 30; 30, 32 is arranged to support vehicle structures.

As shown in FIG. 1 with the example of an articulated tracked vehicle 10 with two vehicle units 11, 12, said vehicle body 30 is arranged for connection to and suspension of said two opposite track assemblies 21, i.e. said track assembly pair 20, via said suspension device S comprising said pendulum arms 52, 54 and gas hydraulic suspension configuration 60 as described above with reference to FIGS. 3a-b and 4a. The two track assemblies 21 of the track assembly pair 20 are arranged on opposite sides of the vehicle body 30 so that the vehicle body 30 is arranged in between said track assemblies 21 of the track assembly pair 21 and such that the main direction of extension of the vehicle body 30 is substantially parallel to the main direction of extension of the respective track assembly 21 of the track assembly pair 20. The same applies to the rear vehicle unit 12.

The tracked vehicle comprises a support wheel suspension configuration configured to resiliently attach said support wheels 23, 23a to said track support beam 22. The support wheel suspension configuration is according to an embodiment comprised in said suspension device S. Said support wheel suspension configuration comprises rocker arms 26 connecting said plurality of support wheels 23, 23a with said track support beam 22. Said rocker arms 26 are configured such that forces acting on said plurality of support wheels 23, 23a cause resilient oscillation of said rocker arms 26. The resilient function of the support wheel suspension configuration of said track assembly will be described in more detail with reference to FIG. 5a-b.

The tension wheels 23a have a slightly different type of suspension than the other support wheels 23. Each tension wheel 23a is suspended by means of a track tension arrangement attached to a rubber bushing similar to the rubber bushings to which the other support wheels 23 are attached. Thereby, the tension wheel attachment acts as a rocker arm. The tension wheels 23a are, similar to the other support wheels 23, contacting the ground via the endless track during normal operation of the vehicle.

The front pendulum arm 52 is dimensioned and configured to resist forces in form of impacts on a front portion of the track assembly. The front pendulum arm 52 is further dimensioned and arranged to resist substantially vertical suspension forces from the support wheel suspension configuration of the track assembly 21.

The rear pendulum arm 54 is dimensioned and configured to resist forces in the form of impacts on a front portion of the track assembly. The rear pendulum arm 54 is further dimensioned and arranged to resist substantially vertical suspension forces from the support wheel suspension configuration of the track assembly 21.

FIG. 4a-d schematically illustrate side views of a tracked vehicle 11 with a suspension device S with different positions of the vehicle body 30 relative to the track assembly 21. The tracked vehicle 11 is travelling on a ground G.

The tracked vehicle 11 is according to an embodiment constituted by the vehicle unit 11 of the articulated vehicle 10 in FIG. 1. The tracked vehicle 11 may also be a standalone vehicle.

The tracked vehicle 11 thus comprises a track assembly pair with right and left track assemblies of which the left track assembly 21 is shown. The tracked vehicle comprises said suspension device S. Said track assembly 21 is arranged to be supported by said vehicle body 30 by means of said suspension device S. Said track assembly comprises a track support beam 22 for supporting a drive wheel 24 and a plurality of road wheels 23, 23a, an endless track 25 being disposed around said wheels 23, 23a, 24.

The suspension device S comprises said pendulum arms 52, 54, described in more detail with reference to FIG. 3a-b. The front pendulum arm 52 is rotatably attached to the front fastening point P1a in the track support beam 22. The rear pendulum arm 54 is rotatably attached to the rear fastening point P2a in the track support beam 22. Said suspension device S comprises distance adjustment means comprising said crank throw configuration 58 for the rear pendulum arm 54 for allowing said distance change between the fastening point P2b in the vehicle body 30 and the fastening point P2a in the track assembly 21 of said rear pendulum arm 54. A distance change is thus also allowed between the fastening point P1b in the vehicle body 30 and the fastening point P2a in the track support beam 22.

Said suspension device S further comprises said gas hydraulic suspension configuration comprising said front hydraulic cylinder 62 rotatably attached to said fastening point P3a in the track support beam 22 and in connection to the front pendulum arm 52 and rotatably attached to said front fastening point P3b of the vehicle body 30 and said rear hydraulic cylinder 64 rotatably attached to said fastening point P4a in the track support beam 22 and in connection to the rear pendulum arm 54 and rotatably attached to said rear fastening point P4b of the vehicle body 30.

FIG. 4a schematically illustrates a side view of the tracked vehicle 11 with a suspension device S where the vehicle body 30 is raised relative to the track assembly 21. Said gas hydraulic suspension configuration is controlled such that the front and rear hydraulic cylinders 62, 64 are expanded so that the vehicle body 30 is raised relative to the track assembly, said pendulum arms 52, 54 allowing said raising of the vehicle body 30. Thus, the vehicle body 30 is raised relative to the track support beam 22 of the track assembly 21. The vehicle body 30 is thus raised relative to said at least one drive wheel 24 and plurality of road wheels 23, 23a being supported and hence attached to said track support beam. Said pendulum arms 52, 54 and the connection of said pendulum arms 52, 54 in said respective fastening points P1b, P2b in the vehicle body and respective fastening points P1a, P2a in the track support beam 22 are allowing said raising of the vehicle body 30 relative to said track assembly 21 and hence track support beam 22 and said thereby supported at least one drive wheel 24 and plurality of road wheels 23, 23a in a plane extending in the longitudinal direction of said track assembly 21 essentially orthogonal to the transversal extension of said track assembly 21.

Figure 4B:
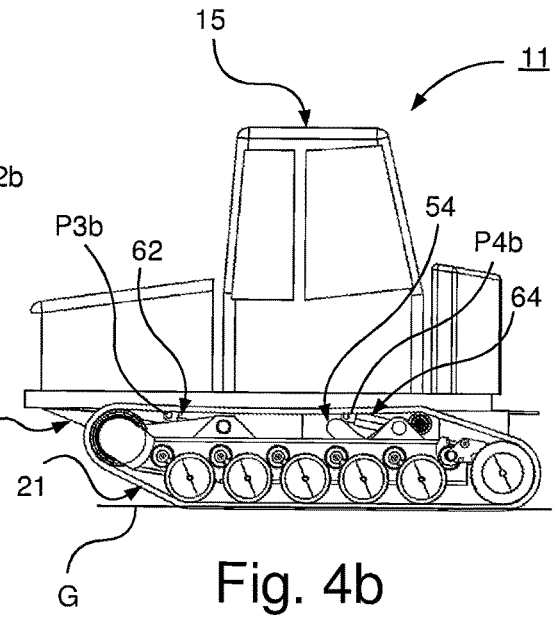
FIG. 4b schematically illustrates a side view of the tracked vehicle in FIG. 4a where the vehicle body is lowered relative to the track assembly.

FIG. 4b schematically illustrates a side view of the tracked vehicle 11 in FIG. 4a where the vehicle body 30 is lowered relative to the track assembly 21. Said gas hydraulic suspension configuration is controlled such that the front and rear hydraulic cylinders 62, 64 are compressed so that the vehicle body 30 is lowered relative to the track assembly, said pendulum arms 52, 54 allowing said raising of the vehicle body 30. Thus, the vehicle body 30 is lowered relative to the track support beam 22 of the track assembly 21. The vehicle body 30 is thus lowered relative to said at least one drive wheel 24 and plurality of road wheels 23, 23a being supported and hence attached to said track support beam. Said pendulum arms 52, 54 and the connection of said pendulum arms 52, 54 in said respective fastening points P1b, P2b in the vehicle body and respective fastening points P1a, P2a in the track support beam 22 are allowing said lowering of the vehicle body 30 relative to said track assembly 21 and hence track support beam 22 and said thereby supported at least one drive wheel 24 and plurality of road wheels 23, 23a in a plane extending in the longitudinal direction of said track assembly 21 essentially orthogonal to the transversal extension of said track assembly 21.

Figure 4C:
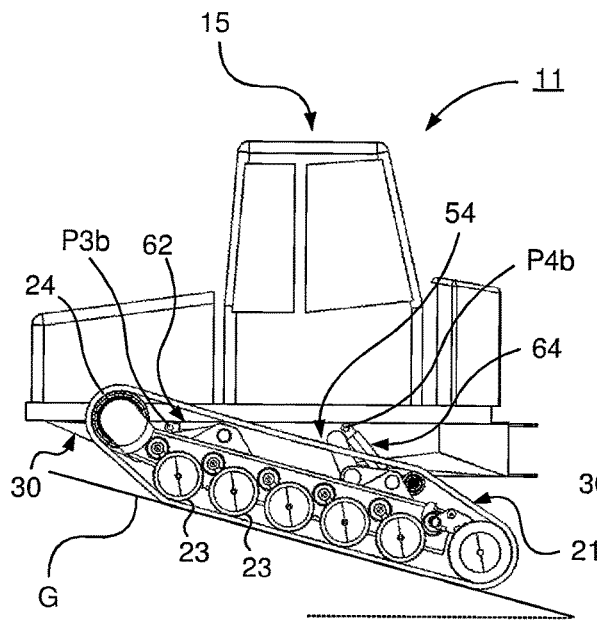
FIG. 4c schematically illustrates a side view of the tracked vehicle in FIG. 4a in an uphill slope where the vehicle body is tilted to a horizontal position relative to the track assembly.

FIG. 4c schematically illustrates a side view of the tracked vehicle 11 in FIG. 4a in an uphill slope of the ground G where the vehicle body 30 is tilted to a horizontal position relative to the track assembly 21. Said gas hydraulic suspension configuration is controlled such that the front hydraulic cylinder 62 is compressed and the rear hydraulic cylinder 64 is expanded so that the vehicle body 30 is lowered relative to a front portion of the track assembly 21 and raised relative to a rear portion of the track assembly, said pendulum arms 52, 54 allowing said tilting of the vehicle body 30. The distance adjustment means according to the present invention facilitates said movement of the vehicle body 30 relative to the track assembly 21. Thus, the distance adjustment means according to the present invention here allows a tilting movement of the track assembly 21, including said at least one drive wheel 24 and plurality of road wheels 23, 23a, relative to the vehicle body in a plane extending in the longitudinal direction of said track assembly 21 essentially orthogonal to the transversal extension of said track assembly 21.

Figure 4D:
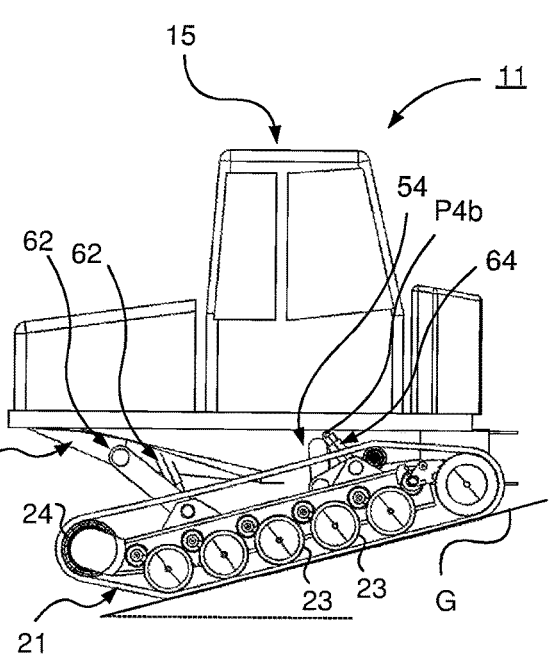
FIG. 4d schematically illustrates a side view of the tracked vehicle in FIG. 4a in a downhill slope where the vehicle body is tilted to a horizontal position relative to the track assembly.

FIG. 4d schematically illustrates a side view of the tracked vehicle 11 in FIG. 4a in a downhill slope of the ground G where the vehicle body 30 is tilted to a horizontal position relative to the track assembly 21. Said gas hydraulic suspension configuration is controlled such that the front hydraulic cylinder 62 is expanded and the rear hydraulic cylinder 64 is compressed so that the vehicle body 30 is raised relative to a front portion of the track assembly 21 and lowered relative to a rear portion of the track assembly, said pendulum arms 52, 54 allowing said tilting of the vehicle body 30. The distance adjustment means according to the present invention facilitates said movement of the vehicle body 30 relative to the track assembly 21. Thus, the distance adjustment means according to the present invention here allows a tilting movement of the track assembly 21, including said at least one drive wheel 24 and plurality of road wheels 23, 23a, relative to the vehicle body in a plane extending in the longitudinal direction of said track assembly 21 essentially orthogonal to the transversal extension of said track assembly 21.

Thus, as illustrated in FIGS. 4c and 4d, by allowing a tilting movement of the track assembly 21, including said at least one drive wheel 24 and plurality of road wheels 23, 23a, relative to the vehicle body, mobility is improved in that the vehicle body may be held essentially horizontal when driving in both uphill slopes and downhill slopes, thereby facilitating transport of cargo when driving in rough terrain, thus enabling increased productivity of a tracked work vehicle.

Figure 5A:
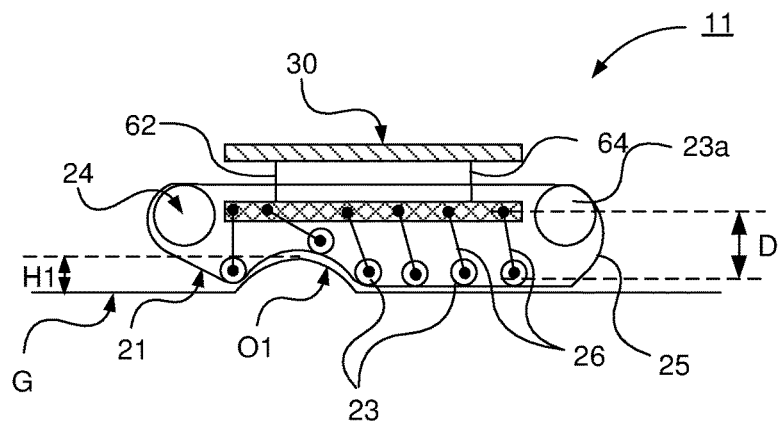
FIG. 5a schematically illustrates a side view of a vehicle unit with suspension device according to an embodiment of the present invention in a first suspension application.
Figure 5B:
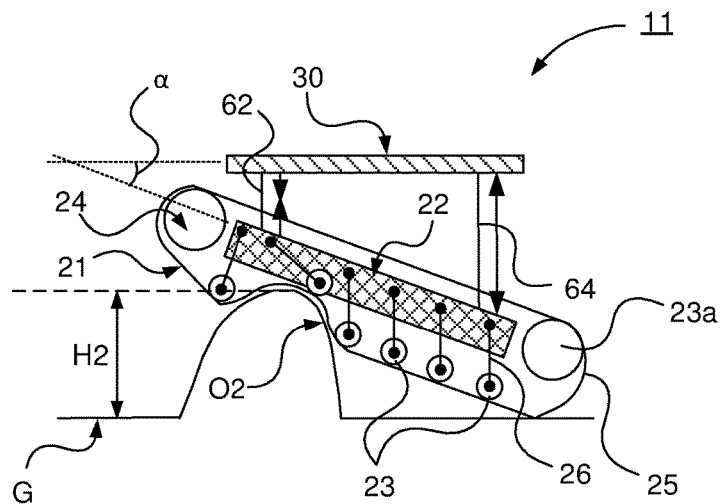
FIG. 5b schematically illustrates a side view of the vehicle unit in FIG. 5a in a second suspension application.

FIG. 5a schematically illustrates a side view of a vehicle unit 11/vehicle 11 with the suspension device according to an embodiment of the present invention in a first suspension application.

The vehicle unit 11 comprises track assemblies with support wheel suspension configurations and a vehicle body 30 connected to a gas hydraulic suspension configuration. The track assembly 21 has at least one drive wheel 24, a plurality of support wheels 23 and an endless track 25, wherein said drive wheel 24 and said plurality of support wheels 23 are rotatably secured to a track support beam 22 of the track assembly 21. The track support beam 22 is according to an embodiment constituted by a skid beam. Said drive wheel 24 is arranged to drive said endless track 25 running over said at least one drive wheel 24 and said plurality of support wheels 23.

Said support wheel suspension configuration comprises rocker arms 26, wherein the respective rocker arm 26 is connected to a support wheel 23 of said set of support wheels 23 to said skid beam kind of track support beam 22. Said rocker arms 26 are configured such that forces acting on said plurality of support wheels 23 cause resilient oscillation of said rocker arms 26.

Said rocker arms 26 are configured to oscillate between a first position such that a first distance is formed between the track support beam 22 and the support wheel 23 and a second bottomed position wherein said support wheel 23 bottoms out in relation to said track support beam 22. Said first position and second position of the rocker arm 26 form a distance D. The bottomed position is, according to one alternative, assumed when the skid beam kind of track support beam 22 is brought into contact with the endless track due to the support wheels 23, by means of said force, being pushed up along the side of the skid beam.

According to this suspension application, a vehicle unit 11 of a vehicle/a vehicle 11 travels over an obstacle O1 of a first type with a dimension reaching to a first height H1 above ground. Said first height H1 of the obstacle O1 is smaller than the vertical distance D between said first position of the rocker arm 26 and the second bottomed position. Said obstacle O1 has a first height H1 making the distance travelled by the rocker arm 26 relative to the first position less than the distance D, such that the rocker arm does not reach the bottomed position.

Thus, said support wheel suspension configuration of the suspension device is configured to oscillate such that said rocker arms 26 connected to the support wheels 23 travelling over the obstacle O1 oscillate resiliently due to the increasing force acting on the support wheels 23 travelling over the obstacle O1, such that these support wheels 23 are pushed up relative to the track support beam 22 of the track assembly 21, substantially corresponding to the height H1 of said obstacle O1. Thereby, the track support beam 22 and so the vehicle unit 11 is held substantially horizontal/in parallel with the ground plane G.

Generally, said gas hydraulic suspension configuration is configured to cooperate with said support wheel suspension configuration based on force acting on said track assembly pair. Said cooperation arises when force acting on said pair of track assemblies is absorbed by said support wheel suspension configuration and any remaining force transmitted to said track support beam is absorbed by said suspension configuration.

Consequently, the support wheel suspension configuration of the support wheels will cooperate with the gas hydraulic suspension configuration comprising said front and rear hydraulic cylinders 62, 64 when force during ground contact also is transferred to track support beam, i.e. when a certain pressure is applied to the track assembly during propulsion of the vehicle the support wheel suspension configuration and the gas hydraulic suspension configuration will cooperate.

Support wheels 23 of the support wheel suspension configuration do not have to bottom out in order for the gas hydraulic suspension configuration to cooperate resiliently. When driving the vehicle in a long inclined plane, several support wheels 23 of the support wheel suspension configuration will be resiliently influenced, whereby the pressure of the gas hydraulic suspension configuration is increased and cooperation with the support wheel suspension configuration takes place.

FIG. 5b schematically illustrates a side view of the vehicle unit 11 in FIG. 5a in a second suspension application. The suspension device comprises two pendulum arms and adjustment means for allowing distance changes between fastening points of said pendulum arms according to the present invention, e.g. two pendulum arms 52, 54 and distance adjustment means 58 as described with reference to e.g. FIG. 3a-b.

According to this suspension application a vehicle 11/vehicle unit 11 of a vehicle travels over an obstacle O2 of a second type with a dimension reaching to a second height H2 above ground level, exceeding said first height H1 of the obstacle O1 of said first type illustrated in FIG. 5a. Said second height H2 of the obstacle O2 exceeds the vertical distance D between said first position of the rocker arm 26 and the second bottomed position.

Hereby, said support wheel suspension configuration of the suspension device is configured to oscillate such that said rocker arms 26 connected to support wheels travelling over the obstacle O2 of said second type oscillate resiliently due to the increasing force acting on the support wheels 23 traveling over the obstacle O2, such that these support wheels 23 are pushed up relative to the track support beam 22 of the track assembly 21 until said support wheel suspension configuration bottoms out, i.e. until one or more rocker arms 26 reaches its bottomed position.

When the height of the obstacle O2 of said second type exceeds the distance D between said first position of the rocker arm 26 and the second bottomed position, the track assembly will hereby rise when the support wheel suspension configuration bottoms out.

The gas hydraulic suspension configuration of the vehicle unit 11 is hereby configured to cooperate with said support wheel suspension configuration such that the hydraulic flow is redistributed between the front and rear hydraulic cylinders 62, 64 when said support wheel suspension configuration bottoms out, i.e. when one or more support wheels 23 of the support wheel suspension configuration bottoms out.

In this case, when the support wheel suspension configuration bottoms out by the rocker arm 26 being sprung to its bottomed position and the track assembly 21 rises, the force acting on the front hydraulic cylinder 62 will be greater than the force acting on the rear hydraulic cylinder 64 such that hydraulic medium is forced through said connection such that a hydraulic flow from the front hydraulic cylinder 62 to the rear hydraulic cylinder 64 is generated, whereby the front hydraulic cylinder 62 is compressed and the rear hydraulic cylinder 64 correspondingly expanded.

Thus, hydraulic flow is in this situation arranged to distributed such that the front and the hydraulic cylinder 62 that in this case absorbs a relatively larger force is compressed, and the rear hydraulic cylinder 64 is correspondingly expanded due to flow of hydraulic flow from the front hydraulic cylinder 62 to the rear hydraulic cylinder 64, wherein an angle a is formed between said track support beam 22 and said vehicle body 30.

The piston rod of the front hydraulic cylinder 62 is thus compressed due to the relatively larger force acting on the front region of the track assembly 21 adjacent to the front hydraulic cylinder 62, and the piston rod of the rear hydraulic cylinder 64 is correspondingly expanded through the increase in pressurised hydraulic medium supplied to the rear hydraulic cylinder 64.

Hereby, the vehicle unit 11 is held substantially horizontal/parallel relative to the ground plane G despite that the track assembly 21/track support beam 22 rises when passing over the obstacle O2 of said second type.

According to one embodiment, said first type of obstacle O1 is an obstacle having a height of about 200 mm, and said second type of obstacle O2 has a height of about 200-400 mm.

The suspension device thus provides, through said gas hydraulic suspension configuration, a bogie function in combination with said support wheel suspension for improved mobility and increased comfort. Furthermore, the load on the vehicle in form of vibrations, shocks and impacts are reduced.

Figure 5C:
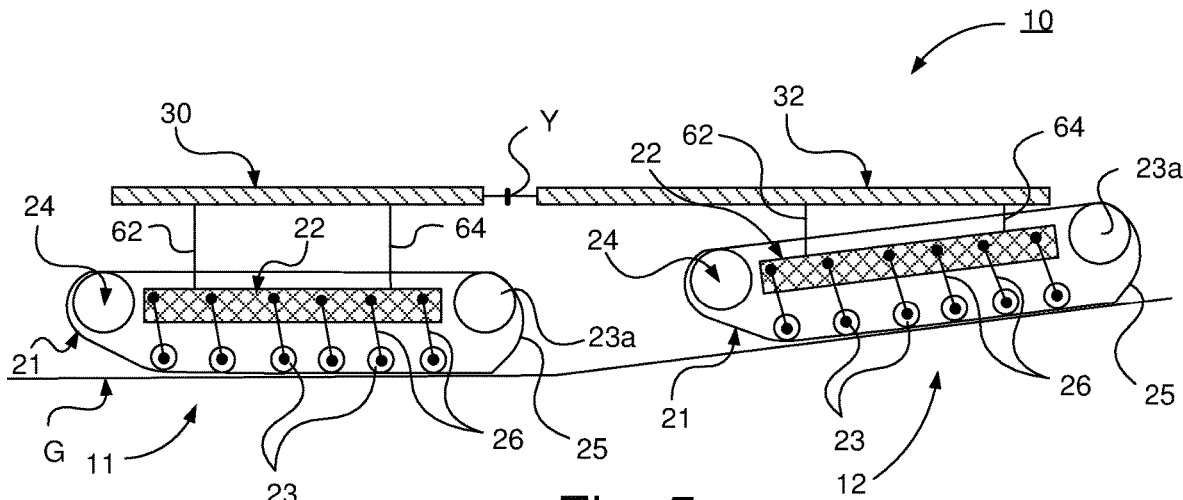
FIG. 5c schematically illustrates a side view of vehicle units with vehicle suspension device according to an embodiment of the present invention in a third suspension application.

FIG. 5c schematically illustrates a side view of vehicle units 11, 12 of an articulated vehicle 10 with a suspension device according to an embodiment of the present invention in a third suspension application. The suspension device comprises two pendulum arms and adjustment means for allowing distance changes between fastening points of said pendulum arms according to the present invention, e.g. two pendulum arms 52, 54 and distance adjustment means 58 as described with reference to e.g. FIG. 3a-b. The vehicle 10 comprises herein a front vehicle unit 11 and a rear vehicle unit 12, pivotally connected to each other via a steering joint Y. The front and rear vehicle units 11, 12 comprise track assemblies 21 corresponding to the track assemblies of the vehicle unit 11 described with reference to FIGS. 5a and 5b, and corresponding suspension device comprising said gas hydraulic suspension configuration comprising front and rear hydraulic cylinders 62, 64. Each track assembly 21 of the each vehicle unit 11, 12 is supported by the respective vehicle body 30, 32 by means of two pendulum arms according to the present invention, e.g. two pendulum arms 52, 54 as described with reference to e.g. FIG. 3a-b.

According to this suspension application the vehicle is traveling off-road, wherein the front vehicle unit 11 has levelled out and the rear vehicle unit 12 is in a downhill slope.

The suspension device comprises a, not shown, control unit configured to control said gas hydraulic suspension configuration based on information received from inclination determining means.

Said control unit is configured to control said gas hydraulic suspension configuration such that the position of the track assemblies 21 relative to the vehicle body 30, 32 is controlled to compensate for inclination. Hereby, according to this alternative, said front and rear hydraulic cylinders 62, 64 of the front vehicle unit 11 are regulated such that the vehicle body 30 is raised relative to its track assemblies 21 and said front hydraulic cylinder 62 of the rear vehicle unit 12, such that the front part of the vehicle body 32 of the rear vehicle unit 12 is raised relative the track assembly 21 and is horizontal, and said rear hydraulic cylinder 64 of the rear vehicle unit 12 is lowered relative to the track assembly such that the rear region of the vehicle body 32 is raised such that the vehicle body 32 is horizontal and such that the load-carrying frame 40 that protrudes above the front and rear vehicle unit 11, 12 is held substantially horizontal.

Above there has been described a suspension device having a suspension configuration constituted by a gas hydraulic suspension configuration. The gas hydraulic suspension configuration comprises a pair of hydraulic cylinders arranged between the vehicle body and the track assembly.

According to an alternative embodiment, the suspension configuration is constituted by a mechanical suspension configuration, for example in accordance with a mechanical suspension configuration of a car, wherein cylinders are constituted by mechanical struts which according to one alternative comprises helical spring members.

According to an alternative embodiment, the suspension configuration is constituted by an air suspension configuration, for example in accordance with an air suspension configuration of a truck.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. A tracked vehicle comprising
a vehicle body,
at least one track assembly and
a suspension device for suspension of said track assembly to said vehicle body of said tracked vehicle,
said track assembly comprising
a track support beam comprising a first element comprising a first fastening point and a second element comprising a second fastening point, wherein the first element and second element project from an upper portion of the track support beam,
a plurality of road wheels,
at least one drive wheel, and
an endless track,
said track support beam being arranged to support said at least one drive wheel and the plurality of road wheels, said endless track being disposed around said at least one drive wheel and the plurality of road wheels, said suspension device comprising
two pendulum arms which at one end are rotatably attached to a respective fastening point in said vehicle body and at the other end are rotatably attached to one of the first or second fastening points of the track support beam of said track assembly, wherein said suspension device comprises
a crank throw configuration for a first pendulum arm of the two pendulum arms for allowing a distance change between the respective fastening point in the vehicle body and the first or second fastening point of the track support beam in the track assembly of the first pendulum arm, and
a suspension configuration for damping the movement of the track assembly relative to the vehicle body and/or for controlling the position of the track assembly relative to the vehicle body, wherein the suspension configuration comprises
a first hydraulic cylinder rotatably attached to the crank throw configuration about a first axis of rotation at the first or second fastening point of the track support beam in the track assembly of the first pendulum arm, and
a second hydraulic cylinder rotatably attached to the track assembly about a second axis of rotation at the first or second fastening point of the track support beam in the track assembly of a second pendulum arm of the two pendulum arms, wherein the first axis of rotation and the second axis of rotation are perpendicular to a plane extending in a longitudinal direction of said track assembly,
so as to allow a tilting movement of the track assembly, including said at least one drive wheel and the plurality of road wheels, relative to the vehicle body in the plane extending in the longitudinal direction of said track assembly essentially orthogonal to the transversal extension of said track assembly.

2. The tracked vehicle according to claim 1, wherein said suspension configuration is arranged between the vehicle body and at least one of said two pendulum arms for damping the movement of said at least one pendulum arm and/or controlling the position of said at least one pendulum arm in said plane.

3. The tracked vehicle according to claim 1, wherein said tracked vehicle is an articulated vehicle comprising a first vehicle unit and a second vehicle unit pivotably connected to the first vehicle unit via an articulation joint, each of said vehicle units comprising a vehicle body and two track assemblies connected to respective sides of said vehicle body by said suspension device.

4. The tracked vehicle according to claim 1, wherein said tracked vehicle is a forestry vehicle.

5. The tracked vehicle according to claim 1, wherein said tracked vehicle is a forwarder.

* * * * *